May 20, 1924.  1,494,421
E. R. HEWITT
MOTOR TRUCK FOR FARM USES
Filed June 22, 1921
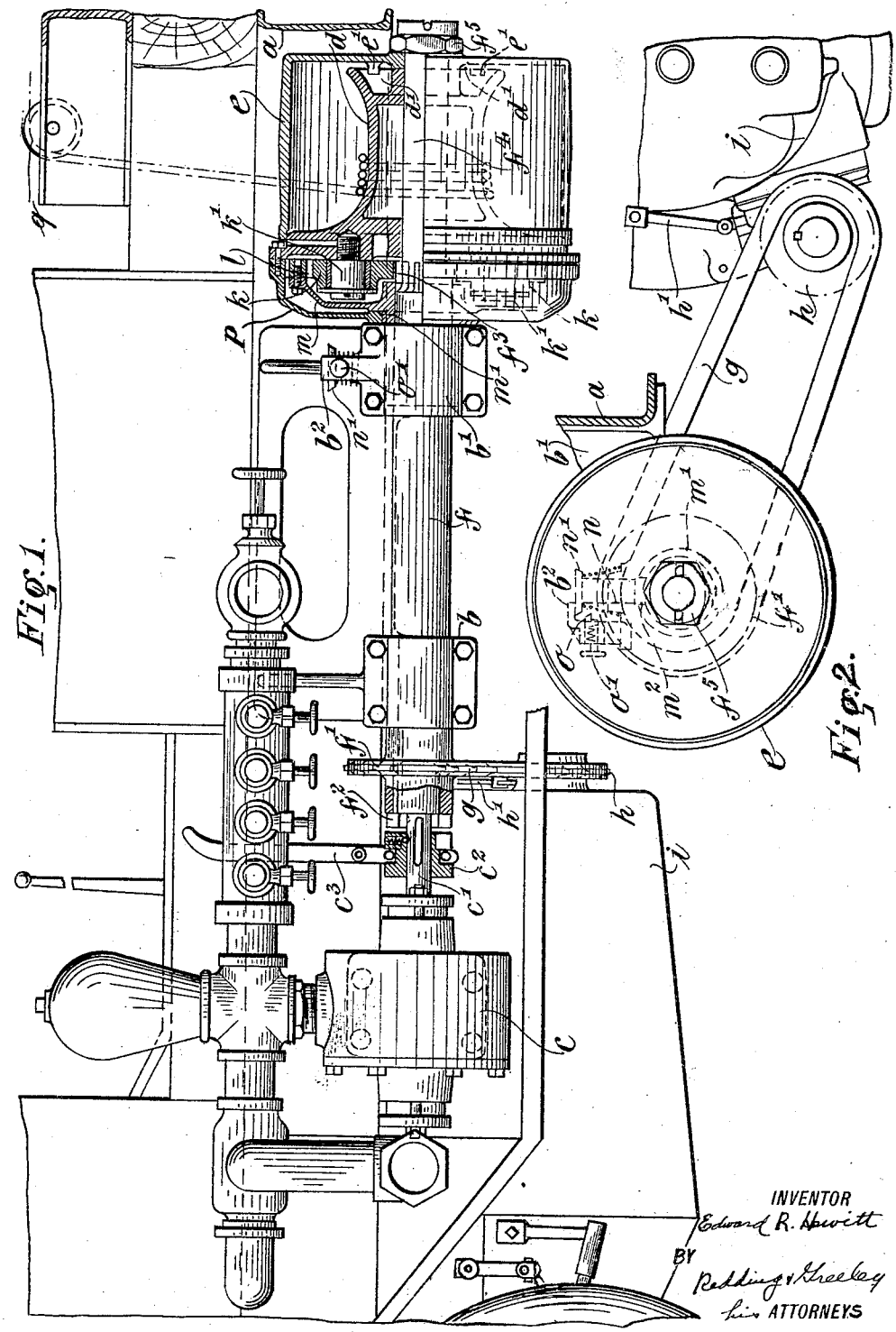
INVENTOR
Edward R. Hewitt
BY
Redding & Greeley
his ATTORNEYS Patented May 20, 1924.

1,494,421

UNITED STATES PATENT OFFICE.

EDWARD R. HEWITT, OF MIDVALE, NEW JERSEY, ASSIGNOR TO INTERNATIONAL MOTOR COMPANY, OF NEW YORK, N. Y., A CORPORATION OF DELAWARE.

MOTOR TRUCK FOR FARM USES.

Application filed June 22, 1921. Serial No. 479,476.

*To all whom it may concern:*

Be it known that I, EDWARD R. HEWITT, a citizen of the United States, residing at Midvale, in the State of New Jersey, have invented certain new and useful Improvements in Motor Trucks for Farm Uses, of which the following is a specification, reference being had to the accompanying drawing, forming a part hereof.

This invention relates to a farm truck which is particularly adapted for special uses all the year round. More particularly, the invention is concerned with the incorporation in a farm truck of auxiliary attachments comprising a pulley for driving other machinery by means of a belt, a nigger head or capstan winch, and a rotary pump, all of which are driven selectively from a common shaft deriving power from the propelling motor of the truck. The pulley is operated at suitable belt speeds for driving farm machinery, such as saws, grinders, cutters, etc., while the capstan winch, heretofore unavailable to farmers, except at prohibitive prices, is driven through reduction gearing for loading, hoisting, fencing, etc. The pulley and the winch are mounted on the same shaft and either one may be driven by suitable manipulation of simple clutch devices within the control of an unskilled operator. In the preferred embodiment the drive shaft is supported at the side of the truck chassis and is in operative relation to a rotary pump which may be connected selectively to said shaft through clutch devices and employed for spraying, water pumping, sprinkling, etc. The common drive shaft employed for the units is itself connected operatively to the power mechanism of the truck through clutch devices operable at will for taking off power when needed.

Advantages and uses of the improved construction will appear with greater particularity hereinafter in connection with the detailed description of the embodiments shown in the drawings, wherein—

Figure 1 is a view in side elevation of a fragment of a truck equipped with the auxiliary attachments, parts being broken away in the interest of clearness.

Figure 2 is a fragmentary view in end elevation of the auxiliary attachments indicating the drive connection between them and the power transmission for the truck.

The truck frame, indicated at $a$, has mounted thereon, preferably at the side thereof, through bearing brackets $b$, all of the improved auxiliary attachments comprising generally the pump $c$, a capstan winch $d$ and a pulley $e$. The capstan winch $d$ is mounted loosely on the common drive shaft $f$ for all of the said units, this drive shaft being journaled rotatably in the bearing brackets $b$. On the drive shaft $f$ is carried a sprocket $f'$ over which passes a drive chain $g$ engaged operatively with the sprocket $h$, adapted to be engaged operatively through a clutch (not illustrated) controlled by an operating lever $h'$, with the power transmission $i$ of the truck. Since the method of clutching and unclutching the power take-off $h$ with the transmission, indicated at $i$, is well known and practised in other constructions, no detailed illustration thereof is given herein. Any suitable devices may be employed in this power take-off.

The pump shaft $c'$ is shown as having feathered thereon a slidable jaw clutch $c^2$ which may be engaged with jaws $f^2$ on the shaft $f$ for imparting rotary movement from the drive shaft to the pump shaft $c'$. Actuation of this clutch collar $c^2$ may be effected conveniently through a clutch lever $c^3$.

The capstan winch $d$ which is mounted loosely on the shaft $f$ is driven through reduction planetary gearing in a manner which will now be described. The shaft $f$ may have cut thereon gear teeth $f^3$ with which mesh a plurality of planetary gears $k$, the supporting pins $k'$ for which may be screwed into the end flange of the capstan winch $d$. The planetary gears $k$ also mesh with an internal gear $l$ which is supported on a spider or plate $m$ formed with a sleeve $m'$ journaled rotatably in one of the bearing brackets $b$ and serving, in turn, as a journal bearing for the shaft $f$. The sleeve $m'$ may be held against rotation by means of a spring-pressed pin $n$ supported slidably in the bearing $b'$ and adapted to be moved in radially to engage a recess $m^2$ in the sleeve $m'$. As shown in Figure 2 the pin $n$ is retracted leaving the sleeve $m'$ free to revolve for a purpose which will appear later, the outward mounted of the pin being limited, however, by a stop $b^2$ supported on the bearing $b'$. If the pin $n$ be forced inwardly by hand when the recess $m^2$ is in line therewith, it will hold the sleeve $m'$ against rotation. The pin may be secured in this locking position by means of a spring-pressed detent $o$ which may have a beveled end to permit the head $n'$ of the pin to move past it. To release the sleeve $m'$ the detent $o$ may be retracted manually by grasping its enlarged end $o'$ and withdrawing it from the path of the spring-pressed pin $n$.

The gears $k$ and $l$ may be enclosed by a cap $p$ which may be bolted to the end flange of the capstan winch $d$. As thus far described, it will be evident that rotation of the shaft $f$ will, through the gear $f^3$, impart rotative movement to the planetary gears $k$, provided the internal gear $l$ is held against rotation by engagement of the pin $n$ with the sleeve $m'$. The gear ratios are such that the winch will be revolved at suitable speed for farm purposes. If desired, a block or roller, indicated at $q$, may be mounted on the chassis in order that a rope over the winch $d$ may exert a line of pull in a plane at right angles to the winch and be used for innumerable purposes, such as loading and unloading, or actually assisting in withdrawing the truck from mire.

The auxiliary attachments lend themselves to a third use by employing a band pulley $e$ which is hollow and may be slipped on to the squared end $f^4$ of the shaft $f$ and over the capstan winch $d$, thereby enclosing the latter. The nut $f^5$ will hold the pulley removably in place, while flanges $e'$ on its inner end wall will engage radial webs $d'$ on the capstan winch $d$ in driving relation. When the pulley $e$ is to be employed the detent $o$ will be tripped to release the pin $n$ from locking engagement with the sleeve $m'$. Rotation of the shaft $f$ will then drive the pulley $e$ and the capstan winch $d$ and all its associated parts will be free to revolve therewith. The use of such a pulley, for farm purposes, driven at suitable belt speeds will be appreciated.

From the description given it will be evident that the construction is one which lends itself to a variety of uses under varied conditions during the year round. Any one of the attachments may be readily connected to the motor of the truck for operation as required. Normally, of course, the drive shaft $f$ for the units does not revolve but it may be quickly connected operatively to the truck transmission $i$ by manipulation of the clutch lever $h'$ for the power take-off. Either the clutch $c^2$ or the pin $n$ may be manipulated depending upon whether the pump, the capstan winch or the pulley is to be driven from the shaft $f$.

Changes in details of construction and arrangement of parts may be made without departing from the spirit of the invention so long as the elements of the appended claims are retained.

I claim as my invention:

1. In a motor truck, a shaft, means to connect the shaft in driving relation with the propelling motor for the truck, a capstan winch mounted loosely on the shaft, planetary gearing carried with the winch, a drive gear carried with the shaft and in mesh with said gearing, an internal gear with which the planetary gears are meshed, and means to hold said internal gear against rotation and comprising a sleeve mounted loosely on the shaft and a pin mounted on the truck and engageable with the sleeve.

2. In combination, a power shaft, a sectional winch and pulley including a winch drum mounted on said shaft and formed with an extended circular flange, and a detachable tubular pulley section adapted to fit over the winch drum and be centered by the shaft at one end and by the circular flange at the other end.

3. In combination, a power shaft, a sectional winch and pulley including a winch drum mounted on said shaft and formed with an extended circular flange, and a detachable tubular pulley section adapted to fit over the drum and be centered by the shaft at one end and by the circular flange at the other end, and driving means for the winch drum interposed operatively between the drum and shaft, and clutching means to render said driving means operative or inoperative.

4. In combination, a power shaft, a sectional winch and pulley including a winch drum mounted on said shaft and formed with an extended circular flange, and a detachable tubular pulley section adapted to fit over the drum and be centered by the shaft at one end, and by the circular flange at the other end, driving means for the winch drum interposed operatively between the drum and the shaft, clutching means to render said driving means operative or inoperative, and driving means for the pulley section engageable operatively between the pulley section and the shaft.

This specification signed this 20th day of June, 1921.

EDWARD R. HEWITT.